United States Patent
Krishnamoorthy et al.

(10) Patent No.: US 11,932,412 B2
(45) Date of Patent: Mar. 19, 2024

(54) SYSTEMS AND METHODS FOR PROVIDING REDUCED FLAPS TAKEOFF AND LANDING ADVICE

(71) Applicant: HONEYWELL INTERNATIONAL INC., Charlotte, NC (US)

(72) Inventors: Nathan Krishnamoorthy, Bangalore (IN); Vatsalya Surana, Bangalore (IN); Ankur Mathur, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 142 days.

(21) Appl. No.: 17/651,514

(22) Filed: Feb. 17, 2022

(65) Prior Publication Data

US 2023/0211893 A1    Jul. 6, 2023

(30) Foreign Application Priority Data

Jan. 5, 2022 (IN) .............................. 202211000518

(51) Int. Cl.
*B64D 43/00* (2006.01)
*B64C 9/00* (2006.01)
*B64D 45/04* (2006.01)

(52) U.S. Cl.
CPC .............. *B64D 43/00* (2013.01); *B64C 9/00* (2013.01); *B64D 45/04* (2013.01)

(58) Field of Classification Search
CPC ............ B64D 43/00; B64D 45/04; B64C 9/00
See application file for complete search history.

(56) References Cited

U.S. PATENT DOCUMENTS

| | | |
|---|---|---|
| 8,275,501 B2 | 9/2012 | Villaume |
| 9,359,065 B2 | 6/2016 | Moser et al. |
| 10,302,451 B1 | 5/2019 | Kim et al. |
| 10,671,090 B2 | 6/2020 | Turetta et al. |
| 2007/0115140 A1 | 5/2007 | Bateman et al. |
| 2010/0252674 A1 | 10/2010 | Lang |
| 2011/0118908 A1* | 5/2011 | Boorman ............. G08G 5/0021 701/14 |
| 2012/0032030 A1 | 2/2012 | Ruckes et al. |
| 2019/0108466 A1 | 4/2019 | Khan et al. |
| 2021/0101674 A1 | 4/2021 | McDonough et al. |
| 2021/0383703 A1 | 12/2021 | Venkataramana et al. |
| 2021/0407306 A1* | 12/2021 | Nielsen ................. G01S 13/935 |

FOREIGN PATENT DOCUMENTS

WO       20070006310 A2    1/2007

* cited by examiner

*Primary Examiner* — John A Tweel, Jr.
(74) *Attorney, Agent, or Firm* — Lorenz & Kopf LLP

(57) ABSTRACT

Methods and systems for providing reduced flaps takeoff or landing advice in an aircraft. The methods and systems include a display device and a processor in operable communication with the display device. The processor is configured to execute program instructions. The program instructions are configured to cause the processor to receive takeoff or landing performance data including weather data and runway conditions data for a plurality of runways at a destination aerodrome, calculate values of takeoff or landing performance parameters for a plurality of flap configurations for each of the plurality of runways, and present, on the display device, at least one of the values of takeoff or landing performance parameters.

14 Claims, 5 Drawing Sheets

METHOD
400

410 RECEIVING TAKEOFF OR LANDING PERFORMANCE DATA FROM A PLURALITY OF SOURCES

420 CALCULATING LANDING OR TAKEOFF PERFORMANCE PARAMETERS FOR EACH COMBINATION OF FLAP SETTING AND RUNWAY

430 RECEIVING SELECTED FLAPS SETTING AND RUNWAY

440 PRESENTING A USER INTERFACE INCLUDING LANDING OR TAKEOFF PERFORMANCE PARAMETERS FOR THE SELECTED FLAPS SETTING AND RUNWAY

450 RECEIVING A NEW SELECTION OF FLAPS SETTING AND RUNWAY

460 UPDATING THE USER INTERFACE TO INCLUDE LANDING OR TAKEOFF PERFORMANCE PARAMETERS FOR THE NEW SELECTION OF FLAPS SETTING AND RUNWAY

FIG. 4

SYSTEMS AND METHODS FOR PROVIDING REDUCED FLAPS TAKEOFF AND LANDING ADVICE

CROSS-REFERENCE TO RELATED APPLICATION

This application claims priority to India Provisional Patent Application No. 202211000518, filed Jan. 5, 2022, the entire content of which is incorporated by reference herein.

TECHNICAL FIELD

The subject matter described herein relates to the provision of takeoff and landing advice regarding aircraft flaps settings.

BACKGROUND

Landing and taking off with reduced flaps can increase efficiency of the operation. In particular, landing with flaps at a lower camber angle than full deployment allows for reduced drag, which requires less thrust and less fuel consumption during an approach or climb phase, reduces noise disturbance near airports, and can provide a better approach angle with a lower pitch and steadier trajectory in turbulence.

It is desirable to provide methods and systems that advise the crew regarding reduced flaps landing. Additionally, it is desirable to provide displays enabling enhanced situational awareness for the flight crew about options available for reduced flaps landing and taking off. Furthermore, other desirable features and characteristics of the present invention will become apparent from the subsequent detailed description and the appended claims, taken in conjunction with the accompanying drawings and the foregoing technical field and background.

BRIEF SUMMARY

In one aspect, a method is provided for advising regarding reduced flaps takeoff or landing in an aircraft. The method includes receiving, via at least one processor, takeoff or landing performance data including weather data and runway conditions data for a plurality of runways at a destination aerodrome, calculating, via the at least one processor, values of takeoff or landing performance parameters for a plurality of flap configurations for each of the plurality of runways, and presenting, via the at least one processor and a user interface, at least one of the values of takeoff or landing performance parameters.

In embodiments, the plurality of flap configurations includes a plurality of flap angles.

In embodiments, the method includes providing, via the at least one processor and the user interface, an alert regarding noise restriction for the destination aerodrome.

In embodiments, the user interface allows selection of one of the plurality of runways and selection of one of the plurality of flap angles by a user so that the user interface presents at least one of the values of takeoff or landing performance parameters associated with the selected one of the plurality of runways and the selected one of the plurality of flap angles.

In embodiments, the method includes calculating, via the at least one processor, values of takeoff or landing performance parameters for the plurality of flap configurations for all runways at the destination aerodrome.

In embodiments, the takeoff performance parameters include at least one of: takeoff weight, takeoff speed mode, maximum allowable takeoff weight, acceleration stop distance, acceleration go distance, usable runway length, required runway length, engine setting, required climb gradient, obstacle required climb gradient, minimum level off height, minimum level off altitude, minimum level off available gradient, and obstacle causing minimum level off.

In embodiments, the landing performance parameters include at least one of: reference speed (Vref), landing weight, required runway length, factored runway length, usable runway length, required landing weight, and wind gust.

In embodiments, the takeoff or landing performance parameters include reference landing speed (Vref), which is calculated based on stall speed and flap configuration.

In embodiments, the takeoff or landing performance parameters include maximum landing weight, which is calculated based on flap configuration.

In embodiments, the takeoff or landing performance parameters include required runway length, which is calculated based on flap configuration.

In another aspect, a system is provided for advising on reduced flaps takeoff or landing advice in an aircraft. The system includes a display device, and at least one processor in operable communication with the display device. The processor is configured to execute program instructions, wherein the program instructions are configured to cause the processor to: receive takeoff or landing performance data including weather data and runway conditions data for a plurality of runways at a destination aerodrome, calculate values of takeoff or landing performance parameters for a plurality of flap configurations for each of the plurality of runways, and present, on the display device, at least one of the values of takeoff or landing performance parameters.

In embodiments, the plurality of flap configurations includes a plurality of flap angles.

In embodiments, the program instructions are configured to cause the processor to provide an alert regarding noise restriction for the destination aerodrome for output on the display device.

In embodiments, the system includes a user input device allowing selection of one of the plurality of runways and selection of one of the plurality of flap angles by a user so that the user interface presents at least one of the values of takeoff or landing performance parameters associated with the selected one of the plurality of runways and the selected one of the plurality of flap angles.

In embodiments, the program instructions are configured to cause the processor to calculate values of takeoff or landing performance parameters for the plurality of flap configurations for all runways at the destination aerodrome.

In embodiments, the takeoff performance parameters include at least one of: takeoff weight, takeoff speed mode, maximum allowable takeoff weight, acceleration stop distance, acceleration go distance, usable runway length, required runway length, engine setting, required climb gradient, obstacle required climb gradient, minimum level off height, minimum level off altitude, minimum level off available gradient, and obstacle causing minimum level off.

In embodiments, the landing performance parameters include at least one of: reference speed (Vref), landing weight, required runway length, factored runway length, usable runway length, required landing weight, and wind gust.

In embodiments, the takeoff or landing performance parameters include reference landing speed (Vref), which is calculated based on stall speed and flap configuration.

In embodiments, the takeoff or landing performance parameters include maximum landing weight, which is calculated based on flap configuration.

In embodiments, the takeoff or landing performance parameters include required runway length, which is calculated based on flap configuration.

In embodiments, the program instructions are configured to cause the processor to: receive a user selection of a combination of one of the plurality of flap configurations and one of the plurality of runways via a user input device; present, on the display device, at least one of the values of takeoff or landing performance parameters for the combination of one of the plurality of flap configurations and one of the plurality of runways; receive a new user selection of a different combination of one of the plurality of flap configurations and one of the plurality of runways via a user input device; and present, on the display device, at least one of the values of takeoff or landing performance parameters for the different combination of one of the plurality of flap configurations and one of the plurality of runways.

BRIEF DESCRIPTION OF THE DRAWINGS

Embodiments of the subject matter will hereinafter be described in conjunction with the following drawing figures, wherein like numerals denote like elements, and:

FIG. 4 is a flowchart of a method for providing reduced flaps takeoff and landing advice, in accordance with an embodiment.

DETAILED DESCRIPTION

Systems and methods described herein provide a reduced flaps takeoff and landing advisor. The systems and methods advise flight crew whether reduced flaps landing or takeoff is possible given current weather and runway conditions. In embodiments, advice is provided to crew on reduced flaps landing or takeoff by computing various landing or takeoff performance parameters for various flap configurations and for various runways at a destination airport. In one embodiment, inputs needed for landing or takeoff computations are automatically read for various runways so that landing or takeoff performance parameters can be calculated. The system performs landing or takeoff computations for each runway in the destination airport for all flap configurations. A user interface presents the landing or takeoff performance parameters for various flap configurations to the crew. The user interface provides advice to the crew on which runway (s) in the destination airport can be used for reduced landing or takeoff flaps. If the airport has noise restrictions, then the same is alerted to the crew so that crew can proactively consider reduced flaps landing or takeoff. The system can collect all the required inputs needed to compute the landing or takeoff performance parameters through a connected framework without pilot intervention.

In one embodiment, landing data is provided on a touch screen controller (TSC) display device for different flaps angles (e.g. 39 and 22 degrees) and for various runways. The flight crew is shown the landing data initially for the default landing flaps configuration (full flaps) and a drop down button (or other selectable element) is provided in the flaps field and the runway field for the crew to select the reduced flaps configuration for various runways and review the landing performance computations for that combination of flaps setting and runway.

Figure 1:
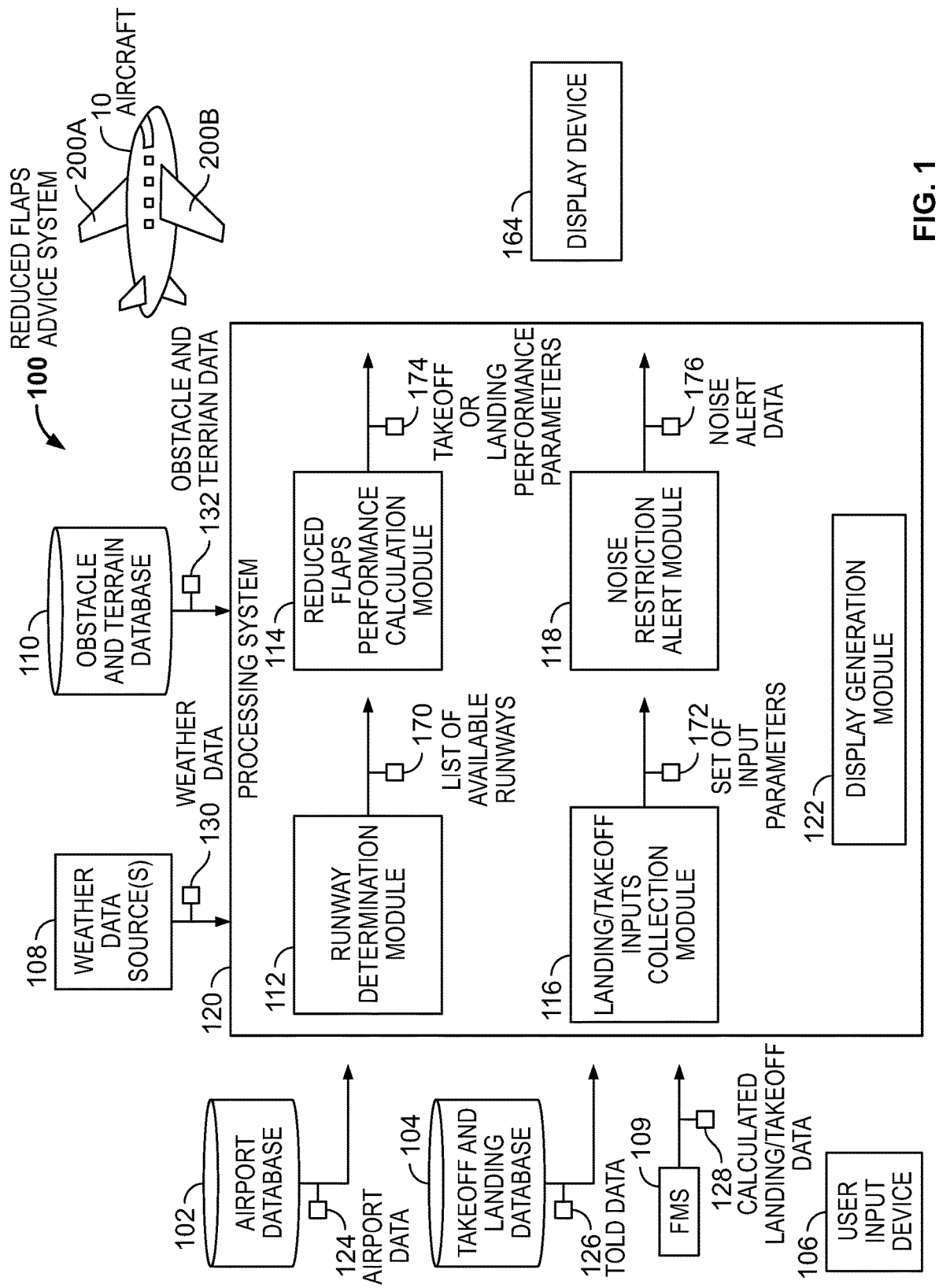
FIG. 1 is a block diagram of reduced flaps advice system for an aircraft, in accordance with an exemplary embodiment.
Figure 2A:
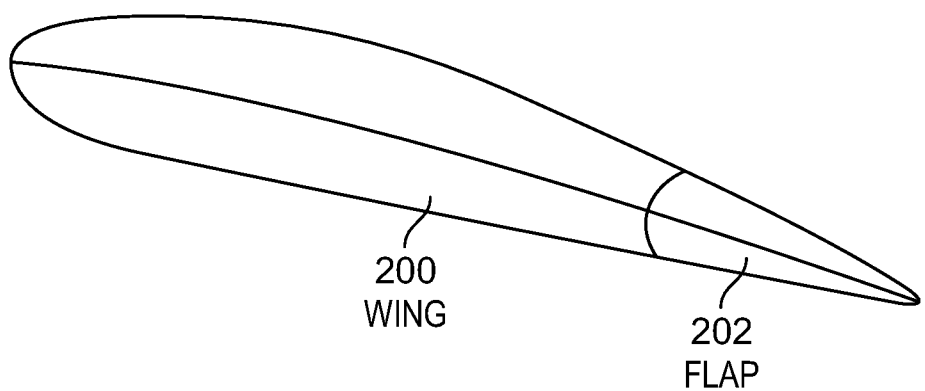
FIGS. 2A and 2B illustrate flap positions on a wing of an aircraft in cross-section.
Figure 2B:
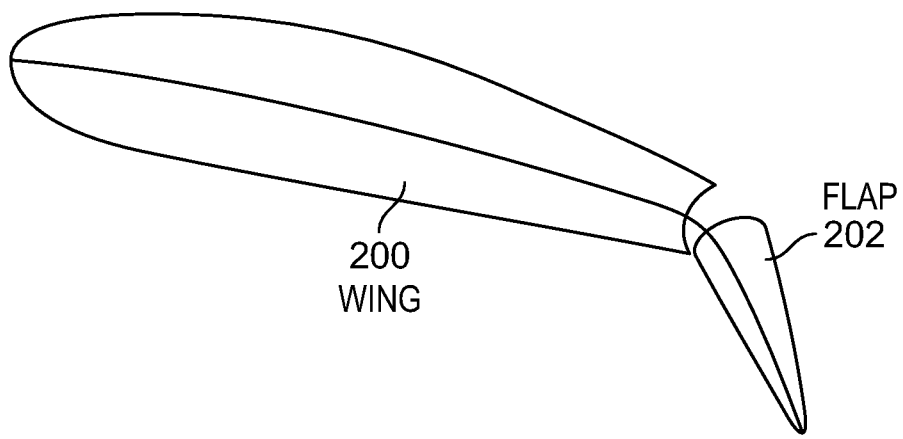

FIG. 1 depicts an exemplary embodiment of a system 100 for providing reduced flaps advice that is associated with an aircraft 10. The aircraft includes wings 200A, 200B. Briefly referring to FIGS. 2A and 2B, one of the wings is shown in cross-section. The wing 200 includes a flap 202, which is in an undeployed position in FIG. 2A and which is in a flaps deployed position in FIG. 2B. The flap angle corresponds to an extent of flap deployment and can be obtained from an angle between a chord of the flap 202 and that of the wing 200. A plurality of flap angles are possible between full deployment and undeployed, which correspond to reduced flaps angles as compared to the full deployment configuration. Referring back to FIG. 1, the illustrated system 100 may be included within avionics systems of the aircraft 10, in a separate computing device (e.g. an Electronic Flight Bag device), may be hosted remotely or a combination thereof. The illustrated system 100 includes a processing system 120 that runs a plurality of software modules (to be described further herein) and which operates in communication with a variety of data providers. The data providers include an airport database 102, a Takeoff and Landing (TOLD) database 104, a Flight Management System (FMS) 109, weather data source(s) 108, and an obstacle and terrain database 110. Further, the processing system 120 receives inputs from a user input device 106 and generates an output for the display device 164.

The processing system 120 executes, using a processor (not shown), programming instructions to: determine runways at an airport, collect all required inputs for each runway for calculating takeoff or landing performance parameters calculations, perform the calculations and generate a user interface that allows selection of flaps configurations and runways and outputs the corresponding takeoff or landing performance parameters. It should be appreciated that FIG. 1 is a simplified representation of the system 100 associated with an aircraft 10 for purposes of explanation and is not intended to limit the subject matter in any way. In this regard, it will be appreciated that, in practice, the system 100 onboard the aircraft 10 may include any number of different onboard systems configured to support operation of the aircraft 10, and the subject matter described herein is not limited to any particular type or number of onboard systems.

The obstacle and terrain database 110 provides a terrain dataset that is a digital representation of the elevation of the terrain and obstacles at discrete points. Exemplary features of the terrain dataset include geometric distribution/position of discrete points, horizontal/vertical datum and specific units of measurement. The terrain dataset describes the surface of the Earth containing naturally occurring features such as mountains, hills, ridges, valleys, bodies of water, permanent ice and snow. The obstacle and terrain database 110 further provides an obstacle dataset, which is a digital representation of obstacles including horizontal and vertical extent of man-made and natural significant features. Obstacles include fixed (whether temporary or permanent) and mobile objects, or parts thereof, that are located in an area intended for the surface movement of aircraft, or extend above a defined surface intended to protect aircraft in flight, or stand outside those defined surfaces and that have been assessed as being a hazard to air navigation. The obstacle and terrain database 110 provides obstacle and terrain data 132 to the processing system 120. The obstacle and terrain data 132 is relevant to calculating landing and performance parameters since the climb or descent gradient is limited by obstacles and terrain, which will thus influence engine settings, available flap configurations, required runway length, maximum weight and other landing and takeoff performance parameters.

The weather data source(s) 108 provide location specific weather data 130 including wind, temperature, pressure and other information on prevailing conditions at a certain location. The weather information sources 108 include surface aviation weather observations from ground stations (e.g. METARs), air traffic control weather information, upper air weather observations (e.g. aircraft meteorological data relay (AMDAR)) and ground-based, satellite or aircraft mounted radar observations (e.g NEXRAD). Weather data source(s) 108 may also include onboard weather sensors. The weather data 130 includes wind information at the location in terms of direction, strength and gusting. The weather data source(s) include one or more information providers concerning runway conditions. For example, air traffic services and aeronautical information services may transmit runway conditions data (which is included in weather data 130) to the flight crew by special series NOice To AirMen (SNOWTAM), Automatic Terminal Information Service (ATIS) and, if necessary, radio broadcast. Runway conditions (e.g. wet, standing water/slush, snow, ice) affect braking efficiency and rolling resistance and thus impact on takeoff and landing performance parameters. Landing and takeoff distances are generally increased with a tailwind as compared to a headwind. There will also be a corresponding impact on takeoff and landing speeds. Crosswinds have intermediate effects due to head or tailwind components. Gusty conditions may require higher approach and takeoff speeds to provide a greater margin above stall. The processing system 120 uses weather data 130 including wind and runway conditions information in calculating landing and takeoff performance parameters.

The airport database 102 provides comprehensive information on airports including runway spatial information including location, orientation and useable length, runway gradient (slope), airport/runway elevation and other information about airports of interest. Airport elevation affects density altitude, which impacts on true airspeed and groundspeed and thus landing and takeoff distances. Runway slope also directly affects landing and takeoff performance parameters. Orientation of the runway is combined with wind information by the processing system 120 to evaluate direction of the wind relative to any given runway. The processing system 120 thus takes into account relevant airport data 124 (including runway slope, elevation, orientation and length) in calculating landing and takeoff performance parameters.

The Flight Management System (FMS) 109 is an onboard multi-purpose navigation, performance, and aircraft operations computer designed to provide data relating to a flight from pre-engine start and take-off, to landing and engine shut-down. The FMS 109 comprises four main components: a Flight Management Computer (FMC), an Automatic Flight Control or Automatic Flight Guidance System (AFCS or AFGS), an Aircraft Navigation System, an Electronic Flight Instrument System (EFIS) or equivalent electromechanical instrumentation. The FMC is a computer system that uses a large data base to allow routes to be pre-programmed and fed into the system by means of a data loader. The system is constantly updated with aircraft position by reference to available navigation aids. The AFCS or AFGS receives sensor information from other aircraft systems. Dependent upon whether the aircraft is under Autopilot or manual control, AFCS mode selections made by the crew will either automatically move and control the aircraft flight control surfaces or display Flight Director commands for the pilot to follow to achieve the desired status. The Navigation System is an integrated package which calculates continuously the aircraft position. It may include Inertial Reference System (IRS) and Global Positioning System (GPS) inputs in addition to receivers for ground based aids. Display of aircraft status is provided on either EFIS or other instrumentation and is where the effect of the FMS 109 control is principally visible.

The takeoff and landing database operates with the FMS 109 to provide TakeOff and Landing Data (TOLD) data 126 including V-speeds, N1 settings, takeoff and landing factorizations and a variety of detailed reference data useful for the FMS to calculate takeoff and landing performance parameters as described further herein. The FMS 109 and the takeoff and landing database 104 receive input data from the processing system 120 and output takeoff and landing performance parameters. The input data includes static information such as airport parameters including airport elevation, runway length, runway gradient, and obstacle location and obstacle height, which is available from the airport database 102 and the obstacle and terrain database 110. The input data includes variable or changing airport parameters such as outside air temperature, barometric pressure, wind direction and speed, and/or runway conditions (e.g., wet, snow, slush, ice), which is available from the weather data source(s) 108. The input data includes aircraft data such as aircraft takeoff weight, aircraft center of gravity, and/or other aircraft data that may affect takeoff and landing performance, which is available from the FMS 109 or from manual entry by the flight crew. The input data further includes a plurality of available flap settings, provided by the processing system 120, and identification of a plurality of runways at the airport so that the FMS 109 outputs calculated landing/takeoff data 128 that includes calculated landing and takeoff performance parameters for each available flap setting and each runway at a destination airport for further use by the processing system 120.

In accordance with the embodiment of FIG. 1, the reduced flaps advice system 100 includes a variety of data providers that send data relevant to the calculation of landing and takeoff landing performance parameters. As described the provided data can include any combination of any subset of the following input data, or all of the following input data. Relevant takeoff input parameters include pilot entered, FMS or other avionics system available parameters (origin identifier, origin runway identifier, thrust mode, flaps setting, anti-ice setting, Brake Temperature Monitoring System (BTMS) setting, thrust reverser setting), weather data 130 from the weather data source(s) 108 (surface wind heading, surface wind speed, outside air temperature, runway condition, runway contaminant depth, pressure altitude), airport information available from takeoff and landing database 104 and/or airport database 102 (runway heading, runway length, runway elevation, runway threshold, runway slope, runway condition, runway contaminant depth, takeoff clearway, takeoff stopway) and obstacle and terrain data 132 available from obstacle and terrain database 110 (obstacle/terrain distance for obstacle/terrain, obstacle/terrain elevation for obstacle/terrain, Standard Instrument Departure (SID) elevation, SID Gradient). Relevant landing input parameters include pilot entered, FMS or other avionics system available parameters (destination identifier, runway identifier, Flaps Setting, anti-ice setting, auto brakes setting, thrust reverser setting), weather data 130 from the weather data source(s) 108 (surface wind heading, surface wind speed, outside air temperature, pressure altitude), airport information from takeoff and landing database 104 and/or airport database 102 (runway heading, runway length, runway elevation), and information provided by a combination of the FMS 109 and the takeoff and landing database 104 (landing factor type, runway multiplier). The landing factor type is set based on runway conditions and prevailing environmental conditions and concerns a safety factor to be applied to landing distances determined under the assumption of dry conditions. For example, a regulatory safety factor of 1.67 may always be applied and an additional 15% may be added if the runway is wet.

The user input device 106 may be a keyboard device (virtual or physical), a voice recognition unit, a touchscreen device, a mouse device, a trackball device, or any other suitable user input device 106. The user input device 106 allows the flight crew to enter any inputs required by the processing system 120 to calculate the takeoff or landing flight performance parameters. The user input device 106 further allows selection of a runway and flap setting combination as will be described further below. The user input device 106 additionally facilitates entry of data into the FMS 109 in order to construct a flight plan including takeoff and landing planning.

The processing system 120 includes a plurality of modules 112, 114, 116, 118, 122 for determining runways at an airport, requesting takeoff or landing flight performance parameters for each runway and for different flap settings and generating a display providing calculated flight performance parameters to the flight crew. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

The processing system 120 includes a runway determination module 112. The processing system 120 may receive an origin or destination airport identifier from the flight crew via the user input device 106 or this information may be pulled from the FMS 109 based on an already entered flight plan. The runway determination module 112 interrogates the airport database 102 to find all runways at the origin or destination airport. This runway information may be filtered to exclude runways that are not adapted for the ownship aircraft type, e.g. due to size, weight and other restrictions. The runway determination module outputs a list of available runways for the landing or takeoff operation.

The processing system 120 includes a landing/takeoff inputs collection module 116 that collects all of the required inputs for the landing or takeoff operation. The various inputs and the data provider for each input has been described in the foregoing. The landing/takeoff inputs collection module 116 may collect the data inputs for each runway in the list of available runways 170. Any adaptations to the data inputs (e.g. wind direction for a particular runway heading) are made by the landing/takeoff inputs collection module 116. The landing/takeoff inputs collection module 116 further receives from the FMS 109, from another avionics system, from user entry or as default for the ownship aircraft, all available flap settings. The landing/takeoff inputs collection module 116 does not require user input for each runway. Any user input required by the processing system 120 (e.g. origin or destination airport) for calculating the takeoff or landing performance parameters only need to be entered once and these manual inputs are replicated for each runway in the list of available runways 170. The landing/takeoff inputs collection module 116 provides a set of input parameters 172 for each runway in the list of available runways 170 and for each flap setting of the available flap settings.

The processing system 120 includes a reduced flaps performance calculation module 114 that receives the set of input parameters 172 and arranges for calculation of the takeoff or landing performance parameters 174. For each runway, the FMS 109 is provided with the set of input parameters 172, which responds with calculated landing/takeoff data 128 for that runway. This process is repeated for each runway in the list of available runways 170 and for each flap setting so that the reduced flaps performance calculation module 114 accesses a full set of takeoff or landing performance parameters 174 for all runways at the airport and for all available runway settings.

The processing system 120 includes a noise restriction alert module 118 that receives information from external source(s), such as the airport database 102, concerning noise abatement policies at the destination or origin airport. The noise policies may be runway and time specific such that the noise restriction alert module 118 can discriminate the output depending on the runway being considered and the time of departure or arrival. The noise restriction alert module 118 outputs noise alert data 176 specifying any applicable noise restrictions that are in effect, which may be runway specific.

The display generation module 122 receives the takeoff or landing performance parameters 174 and the noise alert data 176 and generates a user interface 300 (described below with reference to FIG. 3) displaying all of, or a subset of, the takeoff or landing performance parameters 174 for a selected combination of flaps setting and runway. The user interface 300 is displayed on a display device 164. The user interface 300 includes selectable elements for changing the runway and flaps setting combination, which will result in the corresponding set of takeoff or landing performance parameters 174 being displayed. Further, a noise restriction alert can be displayed (and optionally audibly output) when a noise restriction applies for a currently selected runway. The flight crew is informed by the user interface of relevant takeoff or landing performance parameters 174 for all available combinations of runways and flap settings to allow an informed decision on whether reduced flaps landing or takeoff is possible and practicable. Further, the flight crew is alerted that a reduced flaps landing is preferred for a particular runway when a noise alert is output.

The takeoff or landing performance parameters 174 can be selected from one or more of the following listed parameters. The takeoff performance parameters include takeoff weight, takeoff V1 mode (which corresponds to the speed V1 by which time the decision to continue flight if an engine fails has been made, which can be said to be the "commit to fly" speed), maximum allowable takeoff weight (which is derived from airport data 124 and is adapted based on aircraft takeoff speed and required runway distance), acceleration stop distance (which is the runway length required to accelerate to a specified speed (either VR (rotate speed—nose pitch up speed) or VLOF (lift off speed)), experience an engine failure, and bring the airplane to a complete stop), acceleration go distance (which is the runway length required to accelerate to VR and, assuming an engine failure at that instant, continue on the remaining engine and climb to a height of 50 feet), required runway length, N1 setting (N1 is the speed of a pressure spool of turbine engines of the aircraft 10 and serves as a primary power setting), required climb gradient, usable runway length, obstacle required climb gradient, minimum level off height, minimum level off altitude, minimum level off available gradient, and obstacle causing minimum level off. The landing performance parameters include: VREF Additive (Threshold Speed) (which is 1.3 times the stalling speed in the given landing configuration (including flap angle) and at the prevailing aircraft weight), landing weight, required runway length (which depends on flap angle and landing speed), factored runway length (which is based on required runway length plus a safety factor that depends on Safety factor is dependent on the runway condition), usable runway length, maximum landing weight (which depends on available and required runway distance), wind gust (which depends on runway orientation). As will be discussed further in the following, particularly relevant data to be provided in the takeoff or landing performance parameters for display includes takeoff or landing speed based parameters, aircraft weight based parameters and runway length based parameters or any combination of a subset thereof.

Figure 3:
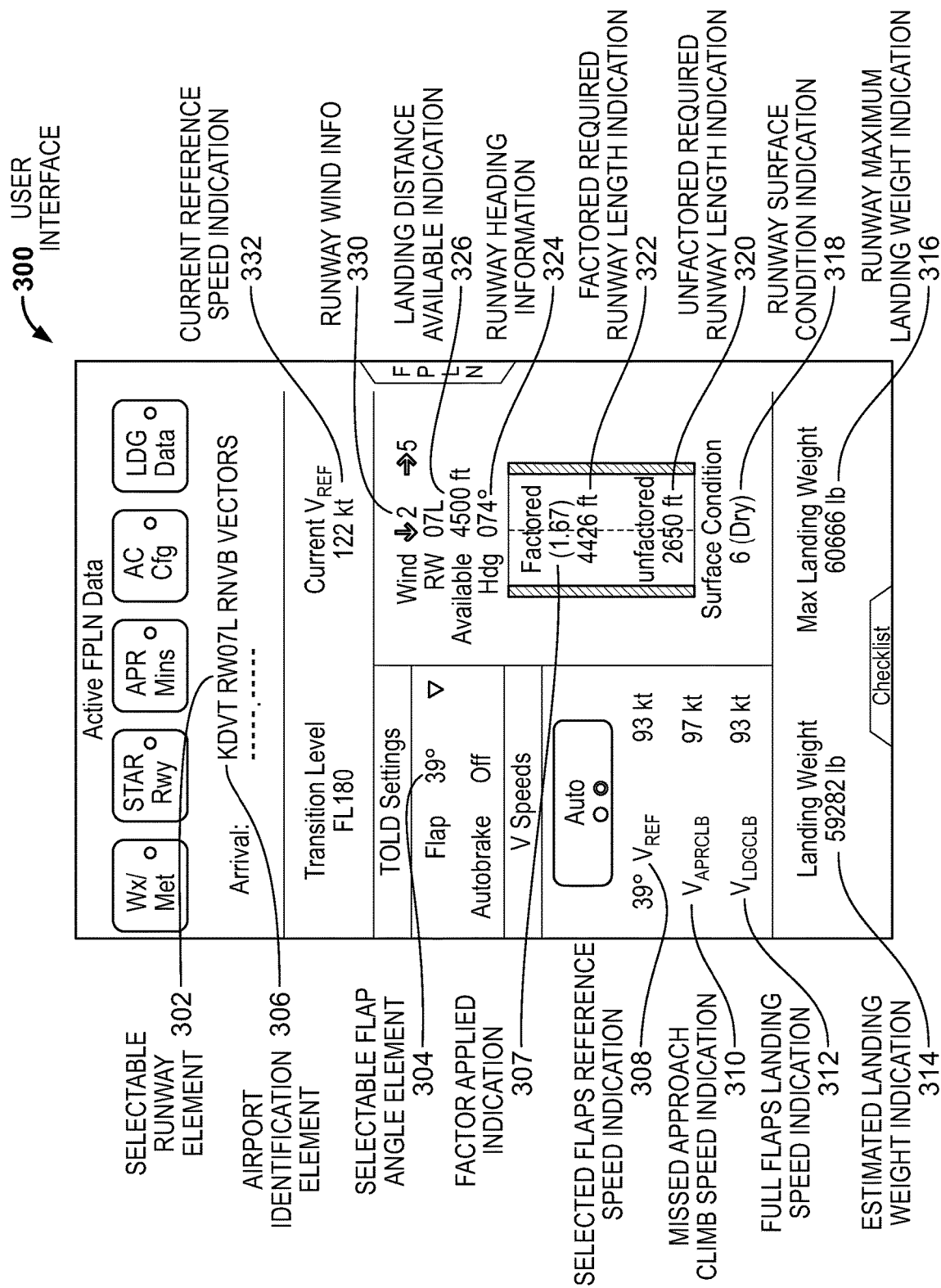
FIG. 3 depicts an exemplary user interface displaying landing and takeoff performance parameters for a plurality of selectable runways and flap angles, in accordance with an exemplary embodiment.

FIG. 3 provides an exemplary user interface 300 depicting landing performance parameters on the display device 164. The user interface 300 is generated by the display generation module 122 using the takeoff or landing performance parameters 174 provided by the reduced flaps performance calculation module 114. The user interface 300 of FIG. 3 is concerned with landing data but a similar user interface could be provided for relevant takeoff performance parameters (e.g. including usable runway, required runway length, takeoff speed, stop distances, engine setting, climb gradient, etc.). The user interface 300 includes at least two interactive elements allowing data entry, specifically a selectable runway element 302 and a selectable flap angle element 304. The selectable runway element 302 allows for selection between all available runways at the destination airport, which can be garnered from airport data 124. The selectable flap angle element 304 allows for selection between all available flap angles for the aircraft 10 according to its configuration. The selectable flap angles may be between 5° and 25° for takeoff and between 20° and 45° for landing, merely as examples. In the disclosed embodiment, the destination airport is KDVT (Phoenix Deer Valley Airport), which is indicated by the airport identification element 306. The user has selected to view landing performance parameters for runway 07 and for flap angle 39°. The The runway may be changed to another available runway by selection of the selectable runway element 302. Similarly, the user may change to another flap angle setting (e.g. a reduced flap angle of 22°) by selection of the selectable flap angle element 304. A drop down menu or other user interface element including all available runway options or all available flap angle settings may be displayed when the selectable runway element 302 or the selectable flap angle element 304 is selected by the user input device 106 (which may be a touch screen controller integrated with the display device 164). The combination of selected runway and selected flap angle causes the display generation module 122 to retrieve the corresponding takeoff or landing performance parameters for that combination and to display the data in various fields of the user interface 300 as described in the following.

The user interface 300 includes a current reference speed indication 332, which is the current VREF speed computed based on the current aircraft configuration including the currently set flap configuration. In this case, the current VREF speed is 122 knots. The user interface 300 further includes a selected flaps reference speed indication 308, which is the VREF based on the flap configuration selected in the selectable runway element 302 but which has not yet been programmed into the FMS 109 for implementation. In this way, a comparison can be made between the current VREF speed based on the currently planned flap angle and the selected flap angle configuration. The user is thus able to select between a plurality of adjusted flap angles and to see the change in VREF as compared to the current VREF, which will not change.

The user interface 300 includes runway wind information 330, which provides for direction and strength components of wind for the selected runway. The user interface 300 further includes runway heading information 324. As the user changes between different runways using the selectable runway element 302, the wind information and the runway heading information will be updated based on the selected runway.

The user interface 300 includes a plurality of runway length elements that are included in the takeoff or landing performance parameters 174. In the present example, a landing distance available indication 326 is provided based on the selected runway. A factored required runway length indication 322 and an unfactored required runway length indication 320 are provided. The unfactored required runway length is calculated for the aircraft configuration (including selected flap angle), the prevailing conditions (including temperature, pressure, and wind) and assuming a dry runway condition. The factored required runway length has a safety factor applied to it based on runway conditions. The runway conditions and the applied factor are also output to the user interface 300 in factor applied indication 307 and runway surface indication 318. The pilot is able to compare the factored and unfactored runway length values to the available runway length values for different runways and flap angles to ascertain whether a reduced flap angle landing is possible and also to derive to which extent the flaps can be reduced from the available settings. The processing system 120 may issue an alert (e.g. using color coding or some other flag on the user interface 300) when the flap setting provides for a factored required runway length that exceeds the available runway length.

The user interface 300 includes an estimated landing weight indication 314 and a runway maximum landing weight indication 316, which are obtained from the takeoff or landing performance parameters 174. The maximum landing weight will change based on flap angle, landing speed, and required runway distance. The landing weight will depend on fuel used in changing flap configurations and changing runways. The pilot is able to scroll through different runways at the airport and different flap settings using the selectable runway element 302 and the selectable flap angle element 304 to determine the maximum landing weight and landing weight values for the combination of runway and flap angle. The processing system 120 may issue an alert (e.g. using color coding or some other flag on the user interface 300) when the flap setting and runway selection provides for a landing weight that exceeds the maximum landing weight.

The user interface 300 includes a plurality of speed indicators obtained from the takeoff or landing performance parameters 174 that guide the flight crew as to speed settings used for a landing based on the selected flap angle. Accordingly, there is a selected flaps reference speed indication 308, which has been described above. Further, there is a missed approach climb speed indication 310, which has been calculated for the selected flap configuration assuming a critical engine is inoperable and an about 2% (for example) climb gradient. A full flaps landing speed indication 312 is also included, which provides a landing speed with full engines and flaps. A landing speed indication (not shown) may also be provided for the selected flap angle to allow comparison with the full flaps landing speed. The V speed indicators of the user interface are updated as the flap angle is changed using the selectable flap angle element 304.

FIG. 3 provides a user interface 300 for the example use case of landing data. A similar user interface for takeoff data is envisaged. The user interface for takeoff performance parameters allows user selection of one of available runways at an origin airport and selection of one of available flap settings for takeoff. The takeoff performance parameters for the combination of runway and flap setting is obtained by the display generation module 122 from the takeoff or landing performance parameters 174 and displayed on the display device. The user interface for takeoff performance parameters includes takeoff weight related parameters, takeoff speed related parameters (e.g. V speeds), runway length related parameters and engine setting related parameters. The user interface allows the flight crew to make an informed decision on whether a reduced flaps takeoff is practicable for a given runway and which angle of reduced flaps is optimal.

A flow chart of an exemplary method 400 of providing reduced flaps advice is provided in FIG. 4. The method 400 is computer implemented by the processing system 120 of FIG. 1, specifically by the various modules of the processing system 120 that are executed by the processing system 120 of FIG. 1.

The method 400 includes a step 410 of receiving takeoff or landing performance data from a plurality of sources. The takeoff or landing performance data includes airport data 124, weather data 130 obstacle and terrain data 132 (for takeoff in particular) and FMS or other avionics provided data regarding aircraft state. The takeoff or landing performance data includes runway information including runway surface conditions and wind information at the origin or destination airport.

The method 400 includes a step 420 of calculating landing or takeoff performance parameters for each combination of available flap setting (according to the aircraft 10 and whether the operation is takeoff or landing) and available runway according to airport data 124. The landing or takeoff performance parameters are computed for all available flap settings and available runways.

The method 400 includes a step 430 of receiving a selection of flaps setting and runway from a user via the user input device 106. The selection may be input through a drop down menu in a user interface, such as the user interface 300 of FIG. 3. The user interface may initially be generated using a default combination of flap setting and runway, which may be full flaps and a most frequently used runway. The computed takeoff or landing performance parameters (or a subset thereof) are displayed in the user interface for the default combination of flap setting and runway. The user may select a different flap setting and/or runway in step 430.

The method 400 includes a step 440 of presenting a user interface, such as the user interface 300 of FIG. 3, including computed landing or takeoff performance parameters for the combination of flaps setting and runway selected in step 430. Exemplary landing or takeoff performance parameters to be included in the user interface are runway length related parameters, takeoff or landing speed related parameters, aircraft weight related parameters and, for takeoff, engine setting related parameters, which are dependent on flaps setting, runway information and weather information at the runway (e.g. wind).

The user interface presented in step 440 allows for selection of a new combination of flaps setting and runway via the user input device 106 in step 450. The user input device 106 may be a touch screen device integrated with the display device 164 through which the presentation of step 440 is output. In step 460, the user interface is updated to include landing or takeoff performance parameters for the selected new combination of flaps setting and runway. Since the processing system 120 collects the landing or takeoff performance parameters for all available combinations of flaps settings and runway, the processing system 120 can select and display the takeoff or landing performance parameters in the user interface for each new selection by the user without submitting a new request to the FMS 109.

In some embodiments, the user interface includes alerts where the computed takeoff or landing performance parameters exceed maximums therefor. Further, the user interface, or some other output device, can output an alert when noise abatement procedures are in effect at a given airport or a given runway at an airport. The alert may take into account the predicted time when the aircraft 10 will be landing at the airport. This alert prompts the flight crew to consider a reduced flaps landing.

The systems and methods described herein facilitate decisions by the flight crew as to whether a reduced flaps landing or takeoff is possible and which flap angle and runway is optimally utilized during a landing or takeoff operation. The systems and methods make it more likely that a flight crew will opt for a reduced flaps landing or takeoff and realize the attendant advantages of reduced flaps landing or takeoff. After being informed of the relevant landing or takeoff parameters for a reduced flaps landing, the flap setting and runway can be entered into the FMS 109 and executed as part of a new or modified flight plan.

Figure 5:
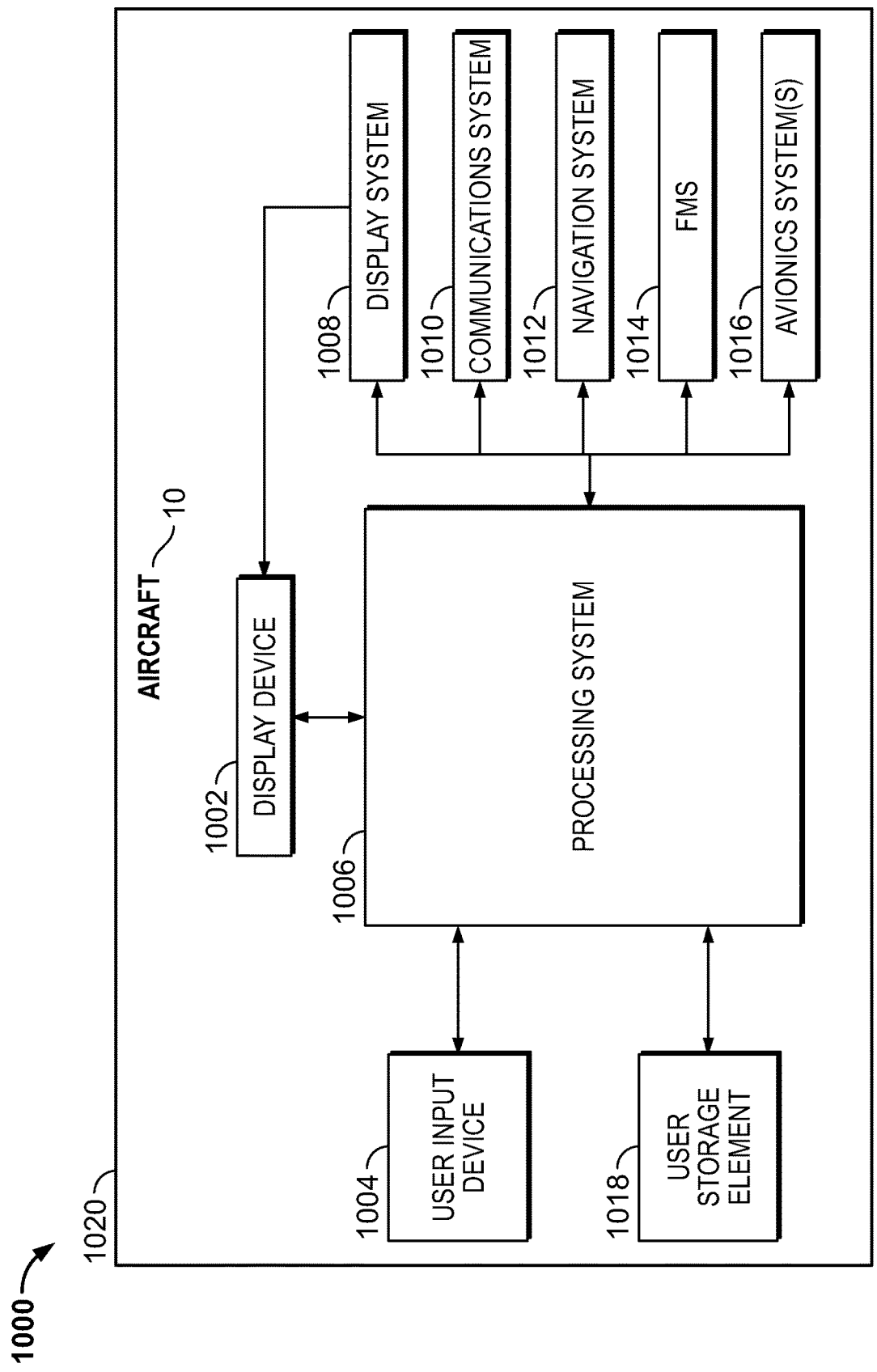
FIG. 5 depicts an exemplary embodiment of an aircraft system suitable for implementing the systems and methods for providing reduced flaps takeoff or landing advice, in accordance with one or more embodiments.

FIG. 5 depicts an exemplary embodiment of an aircraft system 1000 suitable for implementing the reduced flaps advice systems and methods described herein. The illustrated aircraft system 1000 (corresponding to system 100 of FIG. 1) includes, without limitation, a display device 1002 (corresponding to display device 164 of FIG. 1), one or more user input devices 1004 (corresponding to the user input device 106 of FIG. 1), a processing system 1006 (corresponding to the processing system 120 of FIG. 1), a communications system 1010, a navigation system 1012, a flight management system (FMS) 1014 (corresponding to the FMS 109 of FIG. 1), one or more avionics systems 1016, and a data storage element 1018 (suitably configured to support operation of the system 1000).

In exemplary embodiments, the display device 1002 is realized as an electronic display capable of graphically displaying flight information or other data associated with operation of the aircraft 1020 under control of the display system 1008 and/or processing system 1006. In this regard, the display device 1002 is coupled to the display system 1008 and the processing system 1006, wherein the processing system 1006 and the display system 1008 are cooperatively configured to display, render, or otherwise convey one or more graphical representations or images associated with operation of the aircraft 1020 on the display device 1002. The user input device 1004 is coupled to the processing system 1006, and the user input device 1004 and the processing system 1006 are cooperatively configured to allow a user (e.g., a pilot, co-pilot, or crew member) to interact with the display device 1002 and/or other elements of the system 1000, as described herein. Depending on the embodiment, the user input device(s) 1004 may be realized as a keypad, touchpad, keyboard, mouse, touch panel (or touchscreen), joystick, knob, line select key or another suitable device adapted to receive input from a user. In some embodiments, the user input device 1004 includes or is realized as an audio input device, such as a microphone, audio transducer, audio sensor, or the like, that is adapted to allow a user to provide audio input to the system 1000 in a "hands free" manner without requiring the user to move his or her hands, eyes and/or head to interact with the system 1000.

The processing system 1006 generally represents the hardware, software, and/or firmware components configured to facilitate communications and/or interaction between the elements of the aircraft system 1000 and perform additional tasks and/or functions to support the various modules of FIG. 1 during operation of the aircraft system 1000, as described herein. Depending on the embodiment, the processing system 1006 may be implemented or realized with a general-purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processing system 1006 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processing system 1006 includes processing logic that may be configured to carry out the functions, techniques, and processing tasks associated with the operation of the aircraft system 1000, as described herein. Furthermore, the steps of a method or algorithm described in connection with the embodiments disclosed herein may be embodied directly in hardware, in firmware, in a software module executed by the processing system 1006, or in any practical combination thereof. For example, in one or more embodiments, the processing system 1006 includes or otherwise accesses a data storage element 1018 (or memory), which may be realized as any sort of non-transitory short- or long-term storage media capable of storing programming instructions for execution by the processing system 1006. The code or other computer-executable programming instructions, when read and executed by the processing system 1006, cause the processing system 1006 to support or otherwise perform certain tasks, operations, and/or functions described herein in the context of the flight rules alerts. Depending on the embodiment, the data storage element 1018 may be physically realized using RAM memory, ROM memory, flash memory, registers, a hard disk, or another suitable data storage medium known in the art or any suitable combination thereof.

The display system 1008 generally represents the hardware, software, and/or firmware components configured to control the display and/or rendering of one or more navigational maps and/or other displays pertaining to operation of the aircraft 1020 and/or onboard systems 1010, 1012, 1014, 1016 on the display device 1002. In this regard, the display system 1008 may access or include one or more databases suitably configured to support operations of the display system 1008, such as, for example, a terrain database, an obstacle database, a navigational database, a geopolitical database, a terminal airspace database, a special use airspace database, or other information for rendering and/or displaying navigational maps and/or other content on the display device 1002.

Still referring to FIG. 5, in an exemplary embodiment, the processing system 1006 is coupled to the navigation system 1012, which is configured to provide real-time navigational data and/or information regarding operation of the aircraft 1020. The navigation system 1012 may be realized as a global navigation satellite system (e.g., a global positioning system (GPS), a ground-based augmentation system (GBAS), a satellite-based augmentation system (SBAS), and/or the like), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 1012, as will be appreciated in the art. The navigation system 1012 is capable of obtaining and/or determining the instantaneous position of the aircraft 1020, that is, the current (or instantaneous) location of the aircraft 1020 (e.g., the current latitude and longitude) and the current (or instantaneous) altitude or above ground level for the aircraft 1020. The navigation system 1012 is also capable of obtaining or otherwise determining the heading of the aircraft 10 (i.e., the direction the aircraft is traveling in relative to some reference). In the illustrated embodiment, the processing system 1006 is also coupled to the communications system 1010, which is configured to support communications to and/or from the aircraft 1020. For example, the communications system 1010 may support communications between the aircraft 1020 and air traffic control or another suitable command center or ground location. In this regard, the communications system 1010 may be realized using a radio communication system and/or another suitable data link system.

In an exemplary embodiment, the processing system 1006 is also coupled to the FMS 1014, which is coupled to the navigation system 1012, the communications system 1010, and one or more additional avionics systems 1016 to support navigation, flight planning, and other aircraft control functions in a conventional manner, as well as to provide real-time data and/or information regarding the operational status of the aircraft 1020 to the processing system 1006. Although FIG. 5 depicts a single avionics system 1016, in practice, the aircraft system 1000 and/or aircraft 1020 will likely include numerous avionics systems for obtaining and/or providing real-time flight-related information that may be displayed on the display device 1002 or otherwise provided to a user (e.g., a pilot, a co-pilot, or crew member). For example, practical embodiments of the aircraft system 1000 and/or aircraft 1020 will likely include one or more of the following avionics systems suitably configured to support operation of the aircraft 1020: a weather system, an air traffic management system, a radar system, a traffic avoidance system, an autopilot system, an autothrust system, a flight control system, hydraulics systems, pneumatics systems, environmental systems, aircraft systems, engine systems, trim systems, lighting systems, crew alerting systems, electronic checklist systems, an electronic flight bag and/or another suitable avionics system. In various embodiments, the processing system 1006 may obtain information pertaining to the current location and/or altitude of the aircraft 1020 and/or other operational information characterizing or otherwise describing the current operational context or status of the aircraft 1020 from one or more of the onboard systems 1008, 1010, 1012, 1014, 1016.

It should be understood that FIG. 5 is a simplified representation of the aircraft system 1000 for purposes of explanation and ease of description, and FIG. 5 is not intended to limit the application or scope of the subject matter described herein in any way. It should be appreciated that although FIG. 5 shows the various elements of the system 1000 being located onboard the aircraft 1020 (e.g., in the cockpit), in practice, one or more of the elements of the system 1000 may be located outside the aircraft 1020 (e.g., on the ground as part of an air traffic control center or another command center) and communicatively coupled to the remaining elements of the aircraft system 1000 (e.g., via a data link and/or communications system 1010). For example, in some embodiments, the data storage element 1018 may be located outside the aircraft 1020 and communicatively coupled to the processing system 1006 via a data link and/or communications system 1010. Furthermore, practical embodiments of the aircraft system 1000 and/or aircraft 1020 will include numerous other devices and components for providing additional functions and features, as will be appreciated in the art. In this regard, it will be appreciated that although FIG. 5 shows a single display device 1002, in practice, additional display devices may be present onboard the aircraft 1020. Additionally, it should be noted that in other embodiments, features and/or functionality of processing system 1006 described herein can be implemented by or otherwise integrated with the features and/or functionality provided by the FMS 1014. In other words, some embodiments may integrate the processing system 1006 with the FMS 1014. In yet other embodiments, various aspects of the subject matter described herein may be implemented by or at an electronic flight bag (EFB) or similar electronic device that is communicatively coupled to the processing system 1006 and/or the FMS 1014.

For the sake of brevity, conventional techniques related to sensors, statistics, data analysis, avionics systems, redundancy, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

The foregoing detailed description is merely exemplary in nature and is not intended to limit the subject matter of the application and uses thereof. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A method for providing reduced flaps takeoff or landing advice in an aircraft, the method comprising:
receiving, via at least one processor, takeoff or landing performance data including weather data and runway conditions data for a plurality of runways at a destination aerodrome;
calculating, via the at least one processor, values of takeoff or landing performance parameters for a plurality of flap configurations for each of the plurality of runways, the plurality of flap configurations comprising a plurality of all available flap angles for the aircraft and the plurality of runways comprising all available runways at the destination aerodrome;
receiving, at the least one processor, a runway selection from the plurality of runways via a selectable runway element displayed on a user interface;
receiving, at the at least one processor, a flap configuration from the plurality of flap configurations via a selectable flap angle element displayed on the user interface; and
presenting, via the at least one processor and the user interface, at least one of the values of takeoff or landing performance parameters for the selected runway and the selected flap configuration.

2. The method of claim 1, further comprising: providing, via the at least one processor and the user interface, an alert regarding noise restriction for the destination aerodrome.

3. The method of claim 1, wherein the takeoff performance parameters include at least one of:
takeoff weight;
takeoff speed mode;
maximum allowable takeoff weight;
acceleration stop distance;
acceleration go distance;
usable runway length;
required runway length;
engine setting;
required climb gradient;
obstacle required climb gradient;
minimum level off height;
minimum level off altitude;
minimum level off available gradient; and
obstacle causing minimum level off.

4. The method of claim 1, wherein the landing performance parameters include at least one of:
reference speed (Vref);
landing weight;
required runway length;
factored runway length;
usable runway length;
required landing weight; and
wind gust.

5. The method of claim 1, wherein the takeoff or landing performance parameters include reference landing speed (Vref), which is calculated based on stall speed and the flap configuration.

6. The method of claim 1, wherein the takeoff or landing performance parameters include maximum landing weight, which is calculated based on the flap configuration.

7. The method of claim 1, wherein the takeoff or landing performance parameters include required runway length, which is calculated based on the flap configuration.

8. A system for providing reduced flaps takeoff or landing advice in an aircraft, the system comprising:
a display device;
at least one processor in operable communication with the display device, the processor configured to execute program instructions, wherein the program instructions are configured to cause the processor to:
receive takeoff or landing performance data including weather data and runway conditions data for a plurality of runways at a destination aerodrome;
calculate values of takeoff or landing performance parameters for a plurality of flap configurations for each of the plurality of runways, the plurality of flap configurations comprising a plurality of all available flap angles for the aircraft and the plurality of runways comprising all available runways at the destination aerodrome;
receive a runway selection from the plurality of runways via a selectable runway element displayed on a user interface displayed on the display device;
receive a flap configuration from the plurality of flap configurations via a selectable flap angle element displayed on the user interface; and
present, on the user interface displayed on the display device, at least one of the values of takeoff or landing performance parameters for the selected runway and the selected flap configuration.

9. The system of claim 8, wherein the program instructions are further configured to cause the processor to provide an alert regarding noise restriction for the destination aerodrome for output on the display device.

10. The system of claim 8, wherein the takeoff performance parameters include at least one of:
takeoff weight;
takeoff speed mode;
maximum allowable takeoff weight;
acceleration stop distance;
acceleration go distance;
usable runway length;
required runway length;
engine setting;
required climb gradient;
obstacle required climb gradient;
minimum level off height;
minimum level off altitude;
minimum level off available gradient; and
obstacle causing minimum level off.

11. The system of claim 8, wherein the landing performance parameters include at least one of:
reference speed (Vref);
landing weight;
required runway length;
factored runway length;
usable runway length;
required landing weight; and
wind gust.

12. The system of claim 8, wherein the takeoff or landing performance parameters include reference landing speed (Vref), which is calculated based on stall speed and the flap configuration.

13. The system of claim 8, wherein the takeoff or landing performance parameters include maximum landing weight, which is calculated based on flap configuration, and wherein the takeoff or landing performance parameters include required runway length, which is calculated based on flap configuration.

14. The system of claim 8, wherein the program instructions are further configured to cause the processor to:
receive a first user selection of a first combination of one of the plurality of flap configurations and one of the plurality of runways via a user input device;
present, on the display device, at least one of the values of takeoff or landing performance parameters for the first combination of one of the plurality of flap configurations and one of the plurality of runways;
receive a second user selection of a second combination of one of the plurality of flap configurations and one of the plurality of runways via the user input device; and
present, on the user interface displayed on the display device, at least one of the values of takeoff or landing performance parameters for the second combination of one of the plurality of flap configurations and one of the plurality of runways.

* * * * *